(12) United States Patent
Gilliam et al.

(10) Patent No.: US 6,308,432 B1
(45) Date of Patent: Oct. 30, 2001

(54) TWIST LOCK MECHANISM FOR A TAPE MEASURE

(75) Inventors: Edgar T. Gilliam, Franklinton; John B. Moody, Raleigh, both of NC (US)

(73) Assignee: Cooper Brands, Inc., Houston, TX (US)

( * ) Notice: Subject to any disclaimer, the term of this patent is extended or adjusted under 35 U.S.C. 154(b) by 0 days.

(21) Appl. No.: 09/550,535

(22) Filed: Apr. 17, 2000

(51) Int. Cl.[7] .................................................. G01B 3/10
(52) U.S. Cl. ............................................................ 33/767
(58) Field of Search ............................ 33/760, 761, 767, 33/768, 769

(56) References Cited

U.S. PATENT DOCUMENTS

| | | | |
|---|---|---|---|
| 4,288,923 | * 9/1981 | Duda | 33/767 |
| 4,489,494 | 12/1984 | Duda . | |
| 4,697,349 | * 10/1987 | Lee | 33/760 |
| 4,927,092 | 5/1990 | Ingram, II et al. | 33/767 |
| 4,938,430 | 7/1990 | Chapin . | |
| 5,001,843 | 3/1991 | Chapin | 33/767 |
| 5,210,956 | 5/1993 | Knispel et al. | 33/769 |
| 5,379,523 | 1/1995 | Wingert | 33/761 |
| 5,657,551 | * 8/1997 | Lin | 33/767 |
| 6,139,373 | * 10/2000 | Mann | 33/761 |
| 6,272,764 | * 8/2001 | Lin | 33/767 |
| 6,276,071 | * 8/2001 | Khachatoorian | 33/761 |

FOREIGN PATENT DOCUMENTS 0 066 322   5/1982   (EP) .

* cited by examiner

*Primary Examiner*—G. Bradley Bennett
(74) *Attorney, Agent, or Firm*—Coats & Bennett, P.L.L.C

(57) ABSTRACT

A locking mechanism for controlling the retraction and extraction of a tape or other like device. The mechanism includes a housing having a tape opening and a locking mechanism opening. A tape blade extends through the housing tape opening and has a distal end and a proximal end. The tape blade is selectively positionable between a retracted position wherein the distal end is positioned against the housing and an extended position in which the distal end is positioned distant from the housing. A tape biasing device is operatively connected to the tape blade proximal end for urging the tape blade towards the retracted position. A locking mechanism is rotatably mounted within the housing about a plane substantially orthogonal to the tape blade. The locking mechanism has an actuator extending through the locking mechanism openings and a head. The locking mechanism is selectively rotatable between a disengaged orientation in which the head is positioned away from the tape blade, and an engaged orientation in which the head contacts the tape blade.

20 Claims, 7 Drawing Sheets

TWIST LOCK MECHANISM FOR A TAPE MEASURE

FIELD OF THE INVENTION

The present invention is directed generally to a twist lock mechanism and, more particularly, to a tape measure having a pivotable locking mechanism selectively positionable between engaged and disengaged orientations.

BACKGROUND OF THE INVENTION

Tape measures generally include a coiled tape that is spring biased towards a retracted position. A protective housing surrounds the tape and spring and includes an aperture through which a distal end of the tape extends. The distal end of the tape is pulled away from the housing during use in an extended position, and when released, the spring pulls the tape back into the housing such that the tape assumes the retracted position.

Various types of locking mechanisms are utilized for maintaining the tape in the extended position. Locking mechanisms are usually actuated by the user through a slide or push button positioned on an outer edge of the housing. Thus, the tape may be extracted to the desired length and the locking mechanism engaged to hold the tape at that distance. The locking mechanism may then be disengaged and the tape is retracted into the housing.

Many currently existing tape measures feature complicated locking mechanisms for holding the blade in the extended position. These locking mechanisms include a plurality of intermeshing parts which mate together and are selectively moveable between the open and engaged orientations. One drawback of these complicated locking mechanisms is that they result in a higher selling price to the consumer. The numerous individual pieces are often expensive to produce and assemble. Another drawback is that these complicated locking mechanisms are easily damaged if they are roughly handled, dropped, exposed to moisture or debris, and other like treatment.

Further, with existing locking mechanisms it is sometimes difficult for the user to determine when the mechanism is in an engaged or locked orientation. In one common embodiment, the device includes a thumb lock positioned on a front edge of the outer housing such as that disclosed in U.S. Pat. No. 4,489,494. The locking bar is selectively positionable between locked and unlocked orientations. As the thumb lock is slid from the unlocked towards the locked orientation, it is difficult for a user to determine whether it is in a full locked position that will restrict the tape from being retracted into the housing. Preferably, the locking mechanism provides for a definitive locked position in which the user can be assured that the locking mechanism is fully engaged to restrict retraction of the tape blade.

Thus, there is a need for a locking mechanism having a minimum of moveable parts, have adequate durability for use in harsh environments, and be positively locked in an engaged orientation to prevent tape retraction.

SUMMARY OF THE INVENTION

The present invention is directed to a tape measure having a twist lock mechanism for controlling the retraction and extraction of a tape measure. In one embodiment, the device includes a housing with a measuring tape disposed substantially therein and being moveable between an extended position and a retracted position. A locking member is rotatably mounted in the housing about an axis substantially orthogonal to the tape between a first orientation spaced from the tape and a second orientation contacting the tape.

The tape measure housing may include locking mechanism openings, and the locking mechanism may include an actuator that extends through the openings for rotating the locking mechanism between the first and second orientations. The locking mechanism may also include a substantially crescent-shaped head for contacting the tape. Ribs may extend from the housing adjacent to the tape such that the tape is deformed between the ribs and the crescent-shaped head in the engaged orientation to restrict movement of the tape.

In the disengaged orientation, the head may be substantially parallel with a centerline of the tape blade. In the engaged orientation, the head may be substantially perpendicular with a centerline of the tape blade. The tape blade may have a substantially concave shape having outer ends which extend upward from a middle section and the head may contacts the tape outer ends in the engaged orientation. Preferably, the head has a radius of curvature larger than the tape blade.

DETAILED DESCRIPTION OF THE INVENTION

Figure 1:
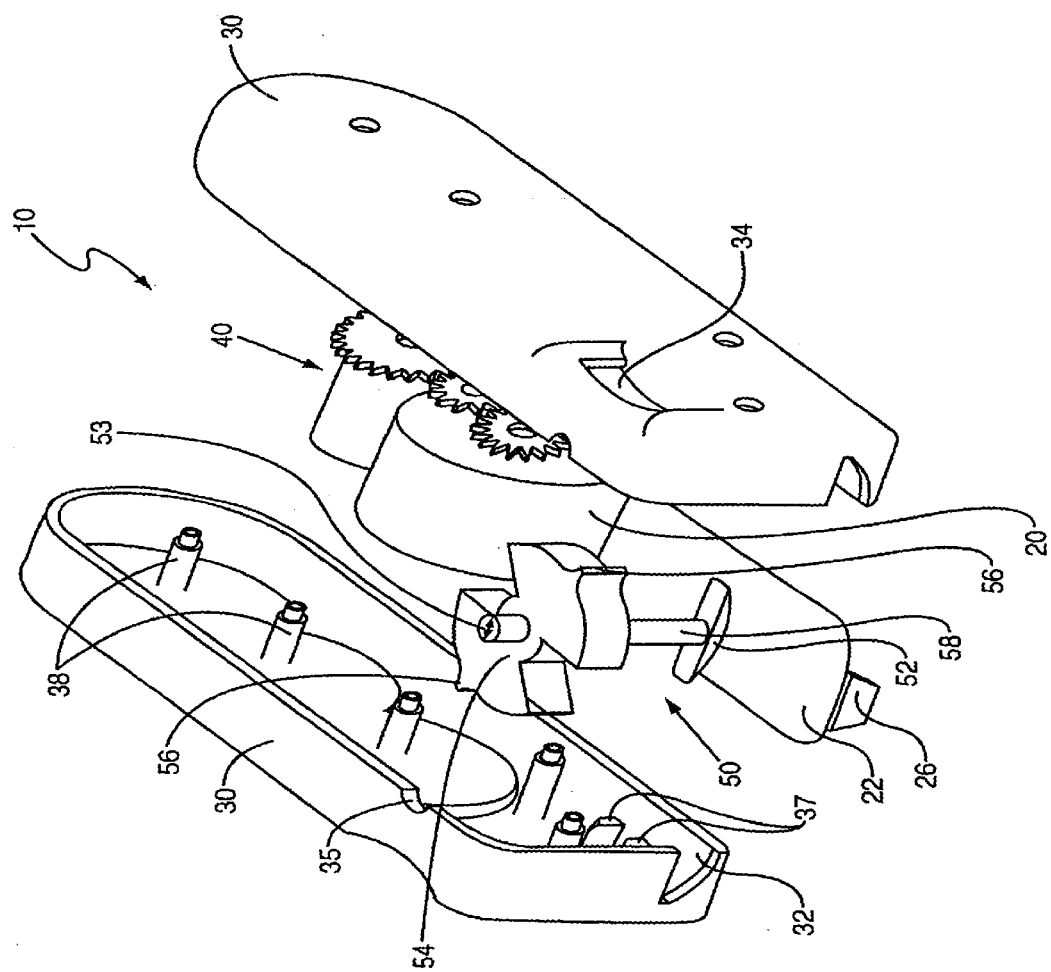
FIG. 1 is an exploded perspective view illustrating the locking mechanism of the present invention.

As illustrated in FIG. 1, a tape measure, generally designated 10, is shown constructed according to the present invention. The tape measure 10 includes a coilable measuring tape 20 contained within a housing 30. The tape includes a distal end 22 which extends through an opening 32 within the housing 30. The distal end 22 is preferably equipped with a lip 26 to restrict it from being retracted into the housing 30. A tape-biasing device 40 is operatively connected to the tape 20 to bias it towards a retracted orientation in which the lip 26 contacts the opening 32. A locking mechanism 50 is selectively positionable between engaged and disengaged orientations to control the extraction and retraction of the tape 20 relative to the housing 30.

The housing 30 extends around and protects the tape 20, tape biasing device 40, and locking mechanism 50. Shafts and/or mounting components 38 may extend outward from one or both sides of the housing for positioning the tape 20, locking mechanism 50, and tape biasing device 40. An opening 32 is positioned within the housing 30 through which the tape distal end 22 extends. A locking mechanism opening 34 is positioned on each of the housing sides for receiving the locking mechanism 50 as will be explained in more detail below. The housing 30 is preferably sized to fit within a user's hand, and also conveniently stored on a work belt or toolbox. As illustrated in FIG. 1, the housing is preferably constructed in a two-piece embodiment for a more straightforward construction process and assembly, and is preferably constructed of a durable material such as a hardened plastic.

Figure 5A:
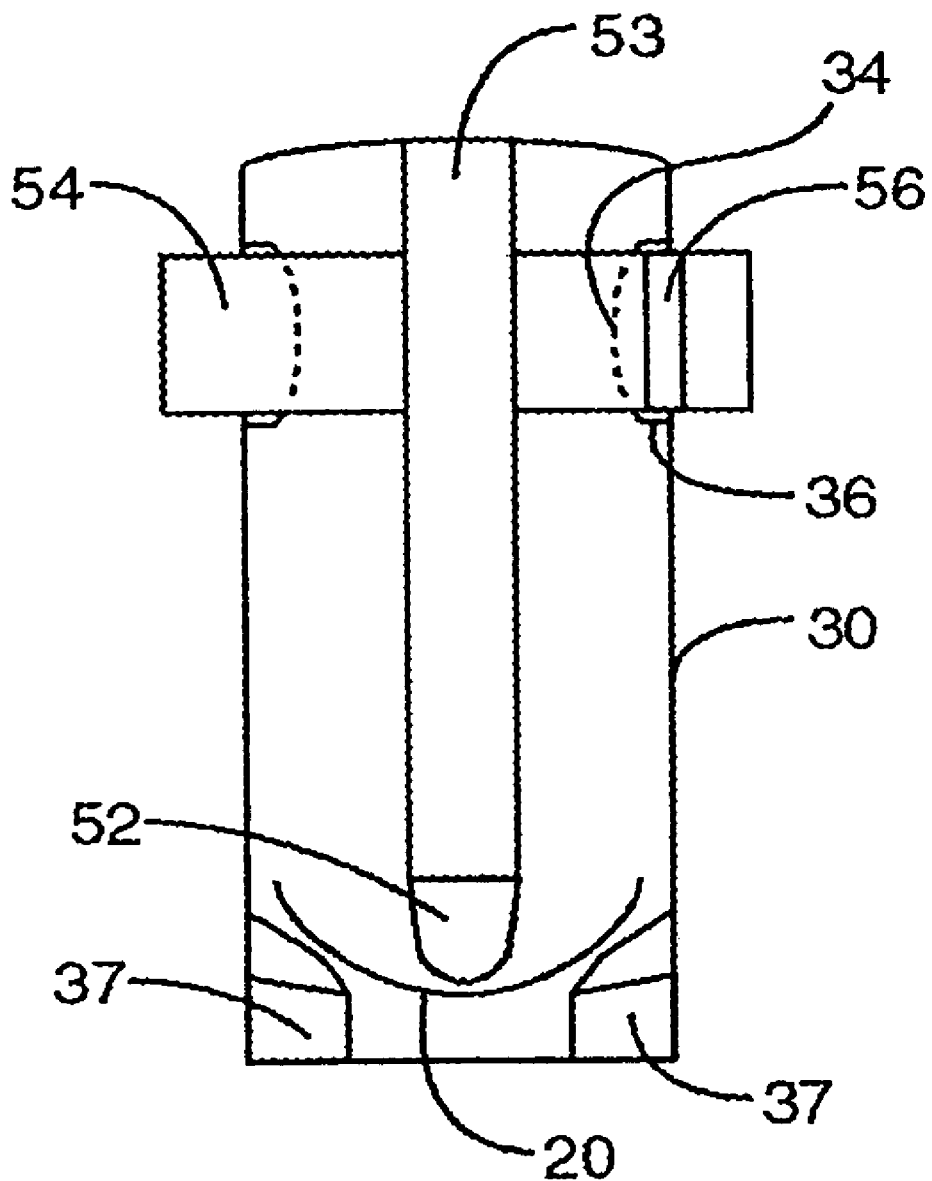
FIG. 5A is a front view taken along line 5A—5A of FIG. 4A illustrating the locking mechanism in the disengaged orientation.
Figure 5B:
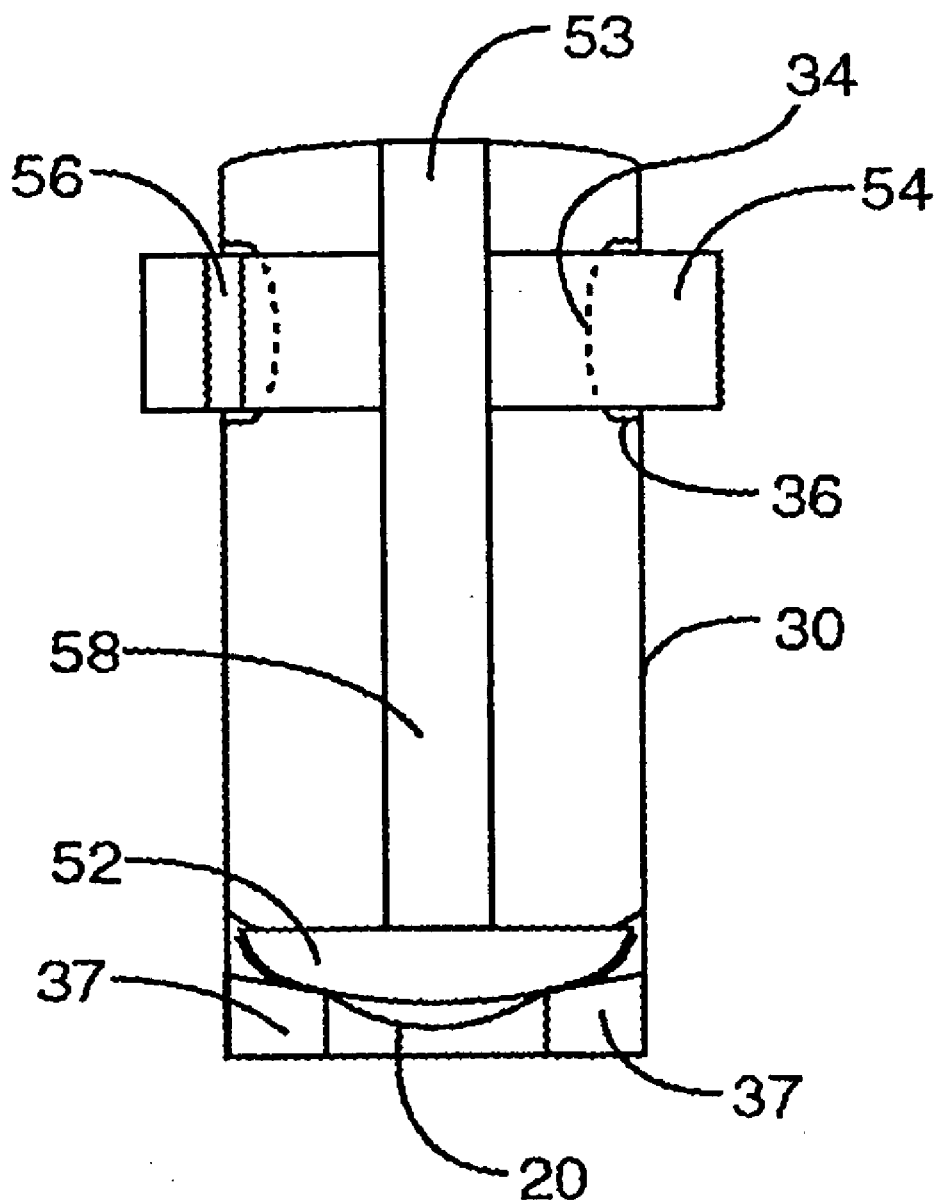
FIG. 5B is a front view taken along line 5B—5B of FIG. 4B illustrating the locking mechanism in the engaged orientation.

Each of the locking mechanism openings 34 preferably includes a shelf 36 for supporting and positioning the locking mechanism actuator 54. An aperture 35 may also be positioned on the upper edge of the housing 30 for receiving and maintaining alignment of the locking mechanism arm extension 53. The locking mechanism openings 34 preferably have inwardly-bowing sections as best illustrated in FIGS. 5A and 5B such that the locking mechanism actuator 54 extends through the openings for access by the user.

A pair of spaced-apart ribs 37 extend inward from the housing and act in concert with the locking mechanism 50 for engaging the tape 20. The ribs 37 are preferably spaced a distance apart approximately equal to the width of the locking mechanism head 52 as illustrated in FIG. 4B. Ribs 37 may have a variety of shapes, including semi-angular with tapered middle areas illustrated in FIGS. 5A and 5B.

The tape biasing device 40 urges the tape 20 into the retracted position within the housing 30. In one embodiment best illustrated in FIG. 3, the device 40 includes a spring 42 positioned in two coils 44, 46. Gears 48 are attached between coil 44 and the tape shaft 38 for transferring the spring biasing force to the attached tape 20. When the tape distal end 22 is extracted from the housing 30, the tape shaft 24 rotates causing rotation of the gears 48 thereby tightening the spring 42 onto the coil 44. When the tape 20 is released, the spring 44 returns to coil 46 thereby rotating the gears 48 and causing retraction of the tape into the housing 30. This type of tape biasing device is disclosed in U.S. Pat. No. 5,119,521, herein incorporated by reference in its entirety. One skilled in the art will understand that other types of biasing devices 40 are available for retracting the tape 20 into the housing 30, any of which may be used with the present invention.

Figure 2:
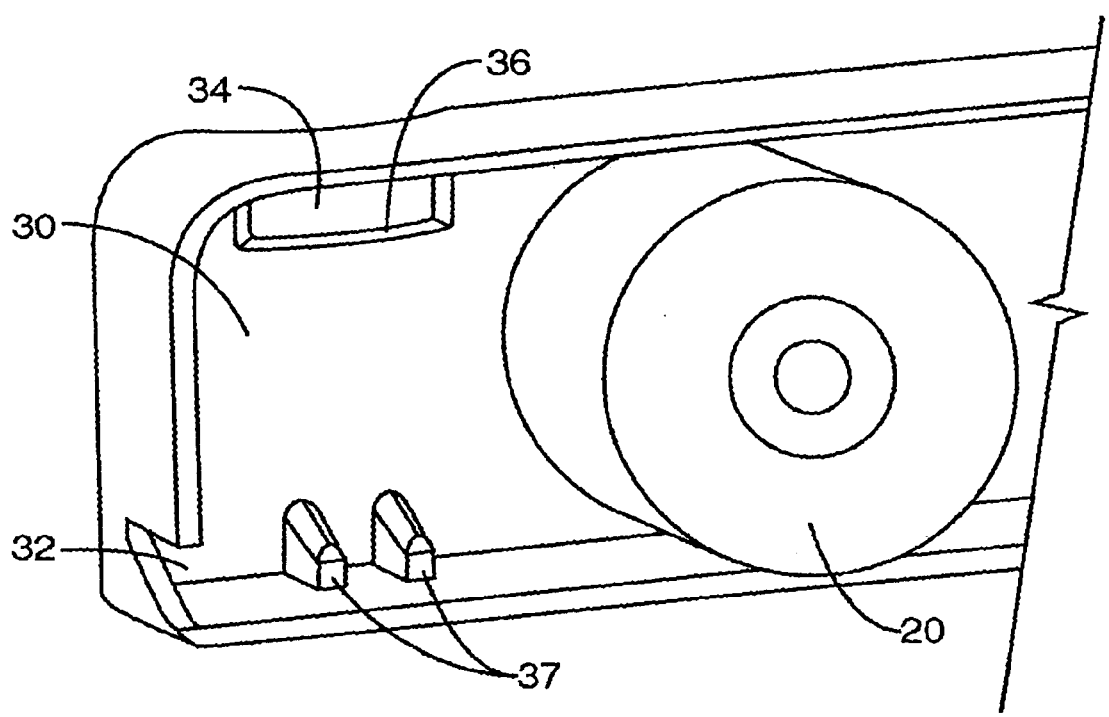
FIG. 2 is a partial perspective view illustrating the locking mechanism opening and ribs of one side of the housing.
Figure 3:
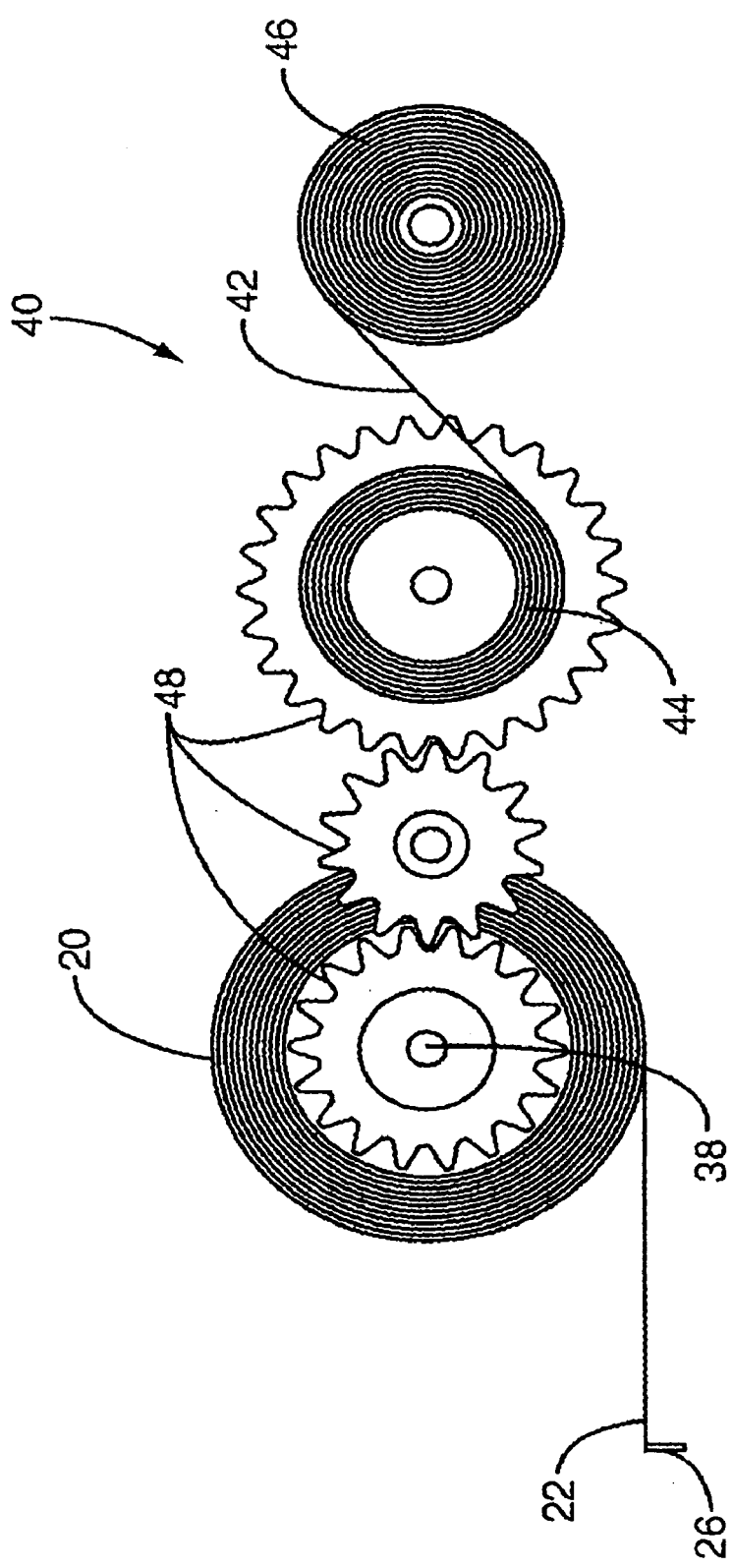
FIG. 3 is a side view illustrating one embodiment of the tape biasing mechanism of the present invention.

The tape 20 is selectively positionable between a retracted position in which the distal end 22 with lip 26 is positioned against the housing opening 32, and an extended position in which the distal end 22 is extended outward from the housing 30. In the retracted position, the tape 20 coils into a substantially circular orientation as illustrated in FIGS. 1, 2, and 3 having a substantially flat shape. In the extracted position, the tape preferably achieves a concave shape as best illustrated in FIGS. 1 and 5A. However, one skilled in the art will understand that the locking mechanism 50 may also be effective on a tape having a substantially flat shape in the extracted position. A section of the tape 20 referenced as the payout section extends between the coiled tape and the tape openings 32.

The locking mechanism 50 includes an actuator 54, head 52, arm 58 extending therebetween, and an arm extension 53 extending beyond the actuator for mounting within the housing aperture 35. The locking mechanism 50 is pivotally connected within the housing 30 to control the extraction and retraction of the tape 20 between an engaged or locked orientation in which the head 52 contacts the tape 20 to restrict retraction and extraction, and a disengaged position in which the head 52 is rotated away from the tape 20 allowing for free retraction and extraction.

The actuator 54 extends outward through the locking mechanism openings 34 to allow the user to selectively rotate the locking mechanism 50. Preferably, the edges of the actuator 54 are sized to extend across each of the locking mechanism openings 34 when rotated in either direction to prevent dirt and other debris from entering into the interior of the housing 30. In the embodiment illustrated, actuator 54 is substantially circular with two cut out sections, however, a variety of shapes are possible and are to be included within the scope of the present invention. Tabs 56 may be positioned on the actuator edges, extending outward through the locking mechanism openings 34. The tabs 56 assist the user in contacting and rotating the locking mechanism 50. Tabs 56 also contact the edges of the locking mechanism opening 34 to control the amount of rotation. By way of example, in the engaged orientation, a first tab 56 extends through and contacts the front edge of the right locking mechanism opening 34 as a second tab 56 extends through and contacts the back edge of the left locking mechanism opening 34. In the disengaged orientation, the arrangement is reversed as the first tab 56 contacts the back edge of the right locking mechanism opening 34 and the second tab 56 contacts the front edge of the left locking mechanism opening 34. The edges of the actuator 54 extending through the locking mechanism openings may also include knurled or roughened edges to further assist the user in rotating the locking mechanism 50.

The head 52 is sized and positioned to contact the tape 20 in the engaged orientation and is positioned away from the tape 20 in the disengaged orientation. In the embodiment illustrated, head 52 is substantially crescent shaped having a radius of curvature larger than the concave-shaped tape 20. This sizing allows the head 52 to contact the tape 20 between the ribs 37 in the engaged orientation as illustrated in FIG. 5B. As illustrated, the outer edges of the head 52 contact the outer edges of the tape 20. In the disengaged orientation, the sizing allows the head 52 to be positioned apart from the tape 20, as illustrated in FIG. 5A, as the outer edges are substantially aligned with the centerline of the tape 20 and curve away from the tape. Other orientations of head shape and size are available and will be understood by one skilled in the art and are to be included within the present invention. Head 52 may further be equipped with a material to increase friction between the tape 20 to prevent slippage of the tape across the head.

Arm 58 extends between the head 52 and actuator 54. An arm extension 53 may extend beyond the actuator 54 and mount within the housing axis opening 35 to further position the locking mechanism 50 within the housing 30.

Figure 4A:
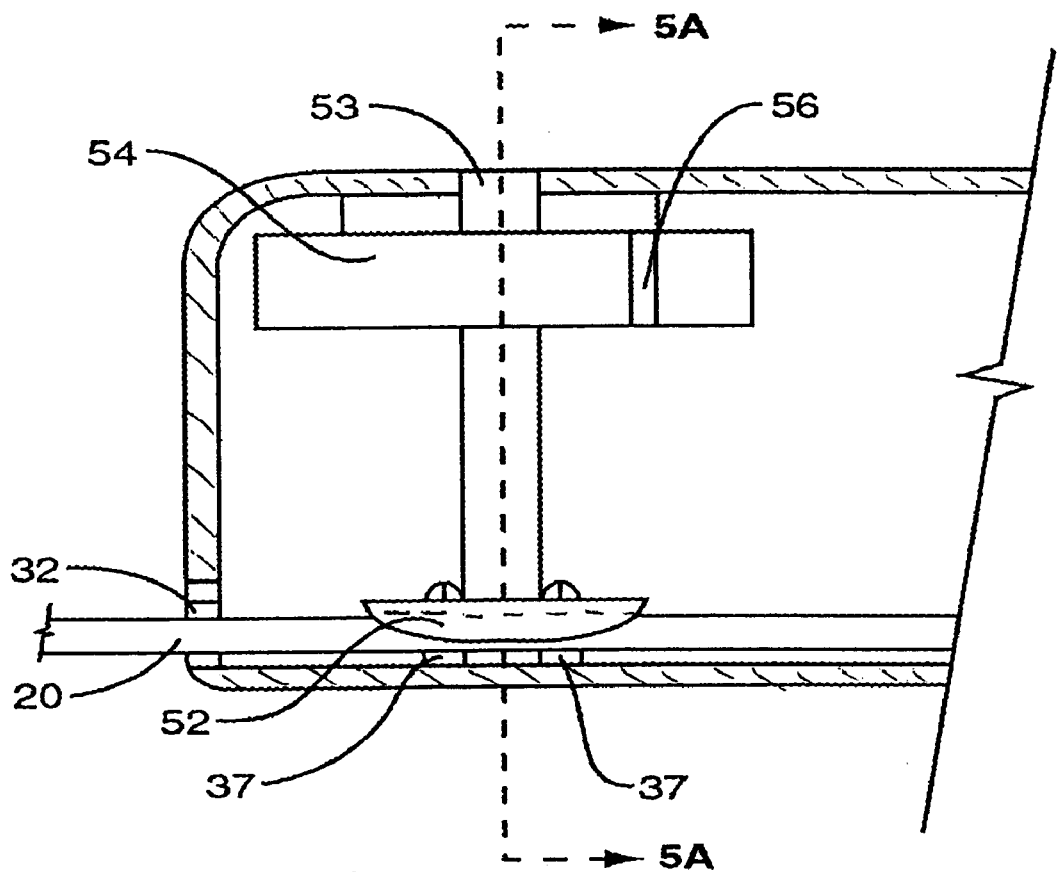
FIG. 4A is a side view illustrating the locking mechanism in the disengaged orientation.
Figure 4B:
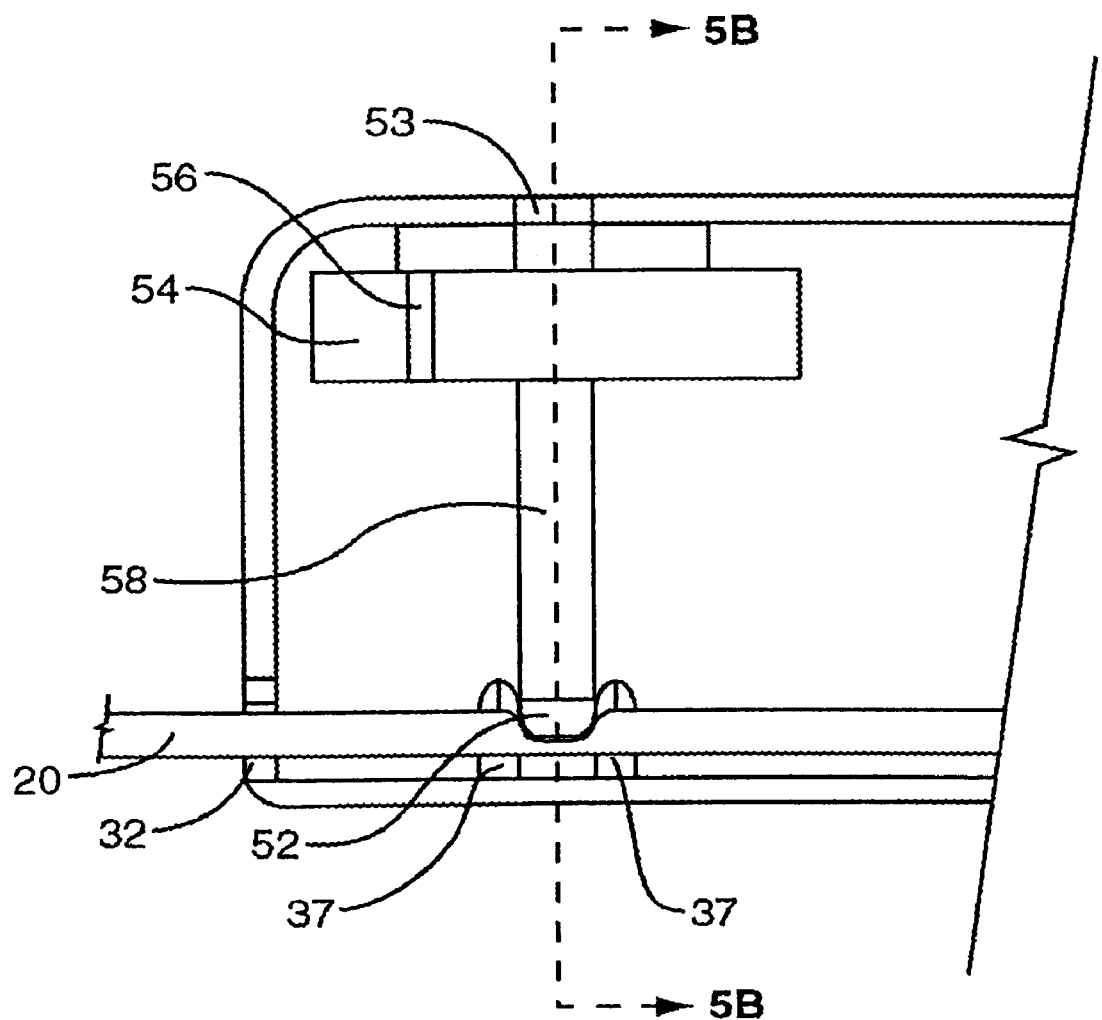
FIG. 4B is a side view illustrating the locking mechanism in the engaged orientation.

FIG. 4A illustrates the locking mechanism 50 in the disengaged orientation. In the disengaged orientation, the head 52 extends across the ribs 37 such that head outer edges are positioned distant from the tape outer edges. In the engaged orientation illustrated in FIG. 4B, the head 52 is substantially aligned between the ribs 37. This orientation provides for head 52 to deform the tape 20 between ribs 37 and restrict retraction and extraction.

FIGS. 5A and 5B illustrate the positioning of the head 52 relative to the tape 20 in the two orientations. In the disengaged orientation illustrated in FIG. 5A, the head 52 is rotated such that it does not contact the tape 20 because the outer edges of the head 52 are aligned within the middle section of the concave tape 20. The head 52 may be substantially parallel with the centerline of the tape 20, or may be slightly off-centered, yet still not contact the tape 20. In the engaged orientation illustrated in FIG. 5B, the head 52 deforms the tape 20 to restrict movement. The outer edges of the head 52 contact the outer tape edges to restrict movement of the tape 20. The deformation of the tape 20 between the head 52 and ribs 37 restricts the motion of the tape 20 into and out of the housing 30. In one embodiment, about 15 lbs. of force is necessary to retract or extract the tape 20 with the locking mechanism in the engaged position.

In the foregoing description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms. It should be understood that the illustrations are for the purpose of describing a preferred embodiment of the invention and are not intended to limit the invention thereto. The present invention may be carried out in other specific ways than those herein set forth without departing from the spirit and essential characteristics of the invention. In one alternative, locking mechanism 50 may be used in other embodiments having retractable cords or elements, such as a leash, power cord retractor, and others. The present embodiments are, therefore, to be considered in all respects as illustrative and not restrictive, and all changes coming within the meaning and equivalency range of the appended claims are intended to be embraced therein.

What is claimed is:

1. A tape measure, comprising:
   a housing;
   a measuring tape disposed substantially within said housing and moveable between an extended position and a retracted position;
   a locking member rotatably mounted in said housing about an axis substantially orthogonal to said tape between a first orientation spaced from said tape and a second orientation contacting said tape.

2. The tape measure of claim 1, wherein said housing further includes locking mechanism openings, said locking mechanism further including an actuator that extends through said opening for rotating said locking mechanism between said first and second orientations.

3. The tape measure of claim 1, wherein said locking mechanism includes a substantially crescent-shaped head for contacting said tape.

4. The tape measure of claim 3, further including ribs extending from said housing adjacent to said tape, said tape being deformed between said ribs and said crescent-shaped head in said engaged orientation to restrict movement of said tape.

5. The tape rule of claim 4, wherein said crescent-shape head is constructed of a frictional material to reduce slipping of said tape in said engaged orientation.

6. A tape measure comprising:
   a housing;
   a tape blade having a coiled section and a payout section;
   a tape biasing device operatively connected to said tape blade coiled section, said tape biasing device urging said tape blade towards a retracted position; and
   a locking mechanism rotatably mounted within said housing about a plane substantially perpendicular to said payout section, said locking mechanism selectively rotated between a disengaged orientation positioned away from said tape blade, and an engaged orientation contacting said tape blade.

7. The tape measure of claim 6, wherein said locking mechanism includes an actuator which extends through a locking mechanism opening in said housing.

8. The tape measure of claim 6, wherein said locking mechanism includes a head for contacting said tape in said engaged orientation.

9. The tape measure of claim 8, wherein said head is substantially parallel with a centerline of said tape blade in said disengaged orientation.

10. The tape measure of claim 8, wherein said head is substantially perpendicular with a centerline of said tape blade in said engaged orientation.

11. The tape measure of claim 8, wherein said tape blade has a substantially concave shape having outer ends which extend upward from a middle section, said head being substantially crescent-shaped such that in said engaged orientation, said actuator contacts said outer ends.

12. The tape measure of claim 11, wherein said head has a radius of curvature larger than said tape blade.

13. The tape measure of claim 8, further including a pair of ribs within said housing, said tape blade being deformed against said blade by said head in said engaged orientation.

14. The tape measure of claim 7, wherein said actuator includes at least one tab, said tab contacting front and back edges of said locking mechanism opening to control the extent of rotation of said locking mechanism.

15. The tape measure of claim 14, wherein said actuator is sized to extend across said locking mechanism opening to prevent debris from entering into said housing interior.

16. The tape measure of claim 14, wherein said locking mechanism further includes an arm extending through an opening in said housing for positioning said locking mechanism.

17. The tape measure of claim 6, further including support ribs extending through an interior of said housing.

18. A retraction device comprising:
   a housing having an element opening and a locking mechanism opening;
   a retraction element extending through said housing element opening and having a distal end and a proximal end, said retraction element being selectively positionable between a retracted position wherein said distal end is positioned in proximity to said housing and an extended position in which said distal end is positioned distant from said housing; and
   a locking mechanism rotatably mounted within said housing about a plane substantially orthogonal to said retraction element, said locking mechanism having an actuator extending through said locking mechanism openings and a head, said locking mechanism selectively rotated between a disengaged orientation in which said head is positioned away from said retraction element, and an engaged orientation in which said head contacts said retraction element.

19. The tape measure of claim 18, wherein said retraction element is a tape measure.

20. A tape measure comprising:
   a housing;
   a measuring tape disposed substantially within said housing and moveable between an extended and retracted position; and
   twist lock means for locking said measuring tape, said means positioned substantially perpendicular to said measuring tape and being selectively positionable between engaged and disengaged orientations.

* * * * *